(12) United States Patent
Thirion

(10) Patent No.: US 10,924,290 B2
(45) Date of Patent: Feb. 16, 2021

(54) METHOD AND DEVICE TO TIMESTAMP A DIGITAL IMAGE

(71) Applicant: Jean-Philippe Thirion, Valbonne (FR)

(72) Inventor: Jean-Philippe Thirion, Valbonne (FR)

(73) Assignee: QuantifiCare S.A., Biot (FR)

( * ) Notice: Subject to any disclaimer, the term of this patent is extended or adjusted under 35 U.S.C. 154(b) by 350 days.

(21) Appl. No.: 15/827,091

(22) Filed: Nov. 30, 2017

(65) Prior Publication Data

US 2018/0197007 A1 Jul. 12, 2018

(30) Foreign Application Priority Data

Jan. 10, 2017 (FR) ...................................... 17 70032

(51) Int. Cl.
| | |
|---|---|
| *H04L 9/32* | (2006.01) |
| *G06F 16/58* | (2019.01) |
| *H04L 29/06* | (2006.01) |
| *G06F 21/64* | (2013.01) |
| *H04N 1/32* | (2006.01) |

(52) U.S. Cl.
CPC ........ *H04L 9/3297* (2013.01); *G06F 16/5866* (2019.01); *G06F 21/64* (2013.01); *H04L 9/3239* (2013.01); *H04L 9/3247* (2013.01); *H04L 63/12* (2013.01); *H04L 63/123* (2013.01); *H04N 1/32144* (2013.01); *G06F 2221/2151* (2013.01); *H04L 2463/121* (2013.01)

(58) Field of Classification Search
CPC ......... H04L 63/12; H04L 63/123; H04L 9/32; H04L 9/3297; H04L 9/3247; H04L 9/3236; H04L 9/3239; H04L 2463/121; G06F 21/64; G06F 2221/2151; G06F 21/16; G06F 21/60; G06F 16/5866; G06F 16/58

See application file for complete search history.

(56) References Cited

U.S. PATENT DOCUMENTS

| | | | |
|---|---|---|---|
| 6,948,069 B1* | 9/2005 | Teppler | H04L 9/3263 380/30 |
| 7,954,157 B2* | 5/2011 | Niles | G02B 26/004 726/23 |
| 2003/0055807 A1* | 3/2003 | Lomet | G06F 16/2477 |
| 2004/0039912 A1* | 2/2004 | Borrowman | H04L 9/3247 713/176 |
| 2009/0185713 A1* | 7/2009 | Koike | G06F 21/608 382/100 |

(Continued)

*Primary Examiner* — Kristine L Kincaid
*Assistant Examiner* — Shaqueal D Wade

(57) ABSTRACT

The method and device are intended to prove the posteriority date (P) and anteriority date (A) of a digital image (IN) including building with a first server a previously unknown code (C) and transmitting this code (C) at the posteriority date (P), acquiring the digital image including a joint representation of a subject (S) and the code (C), computing an electronic fingerprint (EIN) of the digital image (IN), receiving with a second server at the anteriority date (A) the electronic fingerprint (EIN), inserting a combination (EIN+ A) of the electronic fingerprint (EIN) and the anteriority date (A) in a block chain and possibly retrieving and sending back with a third server the recorded posteriority (P) and anteriority (A) dates from the reception of a new digital image (IN2).

The disclosure is intended in particular to prove with images the correct performance of clinical protocol steps in clinical trials.

32 Claims, 7 Drawing Sheets

(56) References Cited

U.S. PATENT DOCUMENTS

| | | | |
|---|---|---|---|
| 2016/0119152 A1* | 4/2016 | Gault | H04L 9/3297 |
| | | | 713/178 |
| 2017/0124421 A1* | 5/2017 | Van Eeuwijk | H04N 5/2256 |
| 2018/0205546 A1* | 7/2018 | Hague | G06F 21/6245 |

* cited by examiner

METHOD AND DEVICE TO TIMESTAMP A DIGITAL IMAGE

BACKGROUND INFORMATION

The present invention relates to a method and a device for time stamping images to demonstrate that a digital image has been acquired between two dates.

Establishing such proof by image is very interesting from a legal point of view. The invention can be used to prove that certain processes have been performed at a given time. It is especially useful in clinical trials, for example to prove that the right patients were indeed present during scheduled visits and to demonstrate given dermatological or aesthetic conditions of these patients at that time. But many other applications can be possible, such as demonstrating by imaging that a given document has been signed at the right time and by the right person.

Date is considered with a broad meaning, as an alphanumerical representation of a given time, preferably absolute and including, on top of the day: hour, minute, second and even fractions of a second.

An example of absolute time is the "Greenwich Mean Time" (GMT). Another example is the "Coordinated Universal Time" (UTC). One way to represent electronically such a date in one of its broadest meaning is described in the ISO 8601 norm: "Data Elements and Interchange formats—Information Interchange—Representation of dates and times", 1988. Another way to represent time, used by computers, is the "Epoch Unix Time Stamp", which is a number representing the number of seconds from Jan. 1, 1970, UTC.

Digital cameras are generally equipped with systems enabling time stamping of pictures, either by overlay in the image of a date as characters or, for digital cameras, by including time information in the header of the image file. Hence, for the JPEG ("Joint Photographic Experts Group") norm, the image file header named "EXIF" (for "Exchangeable Image file Format") is including specific fields to store date information.

There are, however, very simple ways to fake date with such simple time stamping systems, like artificially changing the date of the camera device prior to picture taking. There are also many software enabling editing the EXIF header of a digital image to change dates in the corresponding EXIF fields. Using conventional camera systems to timestamp digital images is adapted to personal applications for users relying upon their own camera date system but cannot be used as a legal proof as it is not possible, except by using very specific and costly camera devices, to demonstrate that a camera was programmed at an exact UTC date when acquisition was performed.

On the other side, there are numerous systems providing the proof that a digital file is anterior to a given date, called "Trusted timestamping". A conventional way to get such anteriority proof is to provide the digital file to a trusted and reputed third party, which certifies the reception date of such digital data. The ANSI norm ASC X9.95-2016 "Trusted Time Stamp Management and Security", being itself the extension of the RFC 3161 norm of 2001: "Internet X.509 Public Key Infrastructure Time-Stamp Protocol (TSP)" defines a way by which a trusted third party can electronically certify that a digital document is anterior to a given date. One example of Institution acting as trusted third party is the "Société des Gens De Lettres" (SGDL), which authenticates and certifies copyright for writers in France since 1838: this Institution has recently moved to computer systems to provide such electronic certification of digital files.

Many certified electronic time stamping systems are using electronic signatures, such as the "Public Key Infrastructure" (PKI), which is involving a public key and a private key. The private key is uniquely known by the trusted third party and the public key enables anybody to verify that an electronic document has been encrypted using the private key of the trusted third party, without any need to disclose the private key.

It must be noted that there is no need to transmit the whole digital file to prove its anteriority date. In many cases, a compact summary of this file, called "electronic fingerprint" or "hash code" is sent to the trusted third party, who is sending back a combination of the digital fingerprint and its reception date, encrypted with the private key of the trusted third party as a proof to store by the user for time stamping. One example of hash code generally used is the "Secure Hash Algorithm" (SHA), which is standardized by the US National Institute of Standards and Technology (NIST).

In order to de-centralize, at a worldwide level, the proof of anteriority of digital files it is possible to insert the electronic fingerprint of a digital file in a distributed worldwide database by the way of techniques known as "Block chain". Such method enables spreading the information about the proof in a public way on a sufficiently large number of independent Internet websites in the world in order to surpass the reputation of any trusted third party and preventing the disappearance of the proof even in the case of a continental disaster.

One well known example of block chain is the "Bitcoin", used to dematerialize money transfers ("Bitcoin: A Peer-to-Peer Electronic Cash System", Nakamoto Satoshi, May 24, 2009). One example of the use of the "Bitcoin" block chain for timestamping electronic documents is described in "Decentralized Trusted Timestamping using the Crypto Currency Bitcoin", iConference 2015, Newport Beach, Calif., USA, Mar. 24-27, 2015, Bela Gipp, Norman Meuschke and André Gernandt.

There exist many ways to provide proof of anteriority of digital files and therefore of a digital photography. However, there are very few ways to prove its "posteriority", that is, proving that an image has been taken "after" a given date. Indeed, someone can acquire a digital photography a long time ago, modify the timestamp of this digital image using a computer or post-date the date of the camera device prior picture taking and register it later on in a time stamping system defining its anteriority.

However, on the contrary to a lot of other digital information, it can be very difficult to fake an image by introducing in the image content information that was not part of the field of view of a real subject. Indeed, the process to create a photographic image is very complex as it relies upon the simultaneous acquisition of millions of points connected between themselves and to the real world via very complex spatial inter-relations. The more complex the subject, including casted shadows, hidden parts and multiple inter-reflections and the more difficult it is to insert a posteriori an element that was not physically present in the field of view of the picture, without a specialist of image processing being able to detect forgery.

At a closer range, any modification in an image is inducing a modification of the image "noise", which corresponds to very small local variations in the image intensity and it is very difficult to insert an element in this image without perturbing that noise and to make such change undetectable by the person of ordinary skill in the art.

Even if the human eye can be misled, a person of ordinary skill in the art possesses series of tests enabling detecting and certifying if the content of an image has been modified or not, which is one specific expertise of forensic departments.

Therefore, including an external element, hard to foresee such as the front page of a newspaper, is an interesting way to time stamp relative to posteriority. Indeed, the front page of a journal is generally presenting information that were unknown the day before. In order to fake image posteriority, such front page should be made in advance or the photography must be forged by introducing the newspaper front page in a way that a person of ordinary skill in the art would not detect.

One would note the limits of using a newspaper, especially relative to the fussy time during which such information can or not be considered as being public: manufacturing a journal is involving numerous people, such as journal owner or journalists, who can possibly know the front page content before it is largely publicized or can influence the front page design and therefore anticipate the front page content.

In order to determine the posteriority of events, one solution is presented in U.S. patent application Ser. No. 14/986,529, "Non-deterministic time generation and event-association system", Gault et al., filed Dec. 31, 2015 by which the generation of a non-deterministic representation of time is used in an attempt to demonstrate posteriority of events. This patent application, however, was abandoned after non-final rejection, because, amongst other things, all claims were rejected under 35 U.S.C. 101 by the examiner as being directed to a judicial exception (i.e. an abstract idea) without adding significantly more. Indeed, as in the case of using a newspaper front-page in an image, steps were possibly performed mentally or with pen and paper and the disclosure failed to ground the invention into a tangible embodiment.

Our own disclosure adds specifically more to the state of the art than what was available and is grounding method steps and devices into tangible operations which cannot be performed by humans with pen and paper. As an example, the implementation of our disclosure making use of a block chain to register events is a non-abstract process. Indeed, this is an operation that humans were not possibly able to perform before a global worldwide network of computers was made available and it would make no sense to try to realize such implementation with pen and paper, as it is the instant interconnection of hundreds of thousands of computers, scattered worldwide, which makes block chain techniques such as the "Bitcoin" successful. Being not abstract, our disclosure is also innovative as no such combination of steps have been proposed in the past to register simultaneously posteriority and anteriority dates of digital images, with distributed worldwide proof associated to these dates, hence offering new standards of proof by image, especially in the field of Clinical Trials.

BRIEF SUMMARY OF THE INVENTION

The method and device being disclosed are for the time stamping of digital images with simultaneous proof of posteriority with respect to a first date and of anteriority with respect to a second date, improving the state of the art corresponding to providing a previously unknown element such as a newspaper front page content in the image. It is fast and with a worldwide distribution of such proof. One advantage is to reduce to much less than a day the interval of time between the posteriority date and the anteriority date and therefore it is very strongly reducing the risks to fake the image date, because forgery would need to be performed in the very short timeframe separating posteriority and anteriority dates.

Our method and device is making use of a world distributed block chain, such as for example the crypto currency Bitcoin, as well as servers in order to produce previously unknown codes in real time and to store and retrieve the electronic fingerprint of the posteriority and anteriority proof.

Applications of our invention are numerous and are including the possibility to provide proof by image for operations performed in clinical trials.

DETAILED DESCRIPTION OF THE INVENTION

Figure 1:
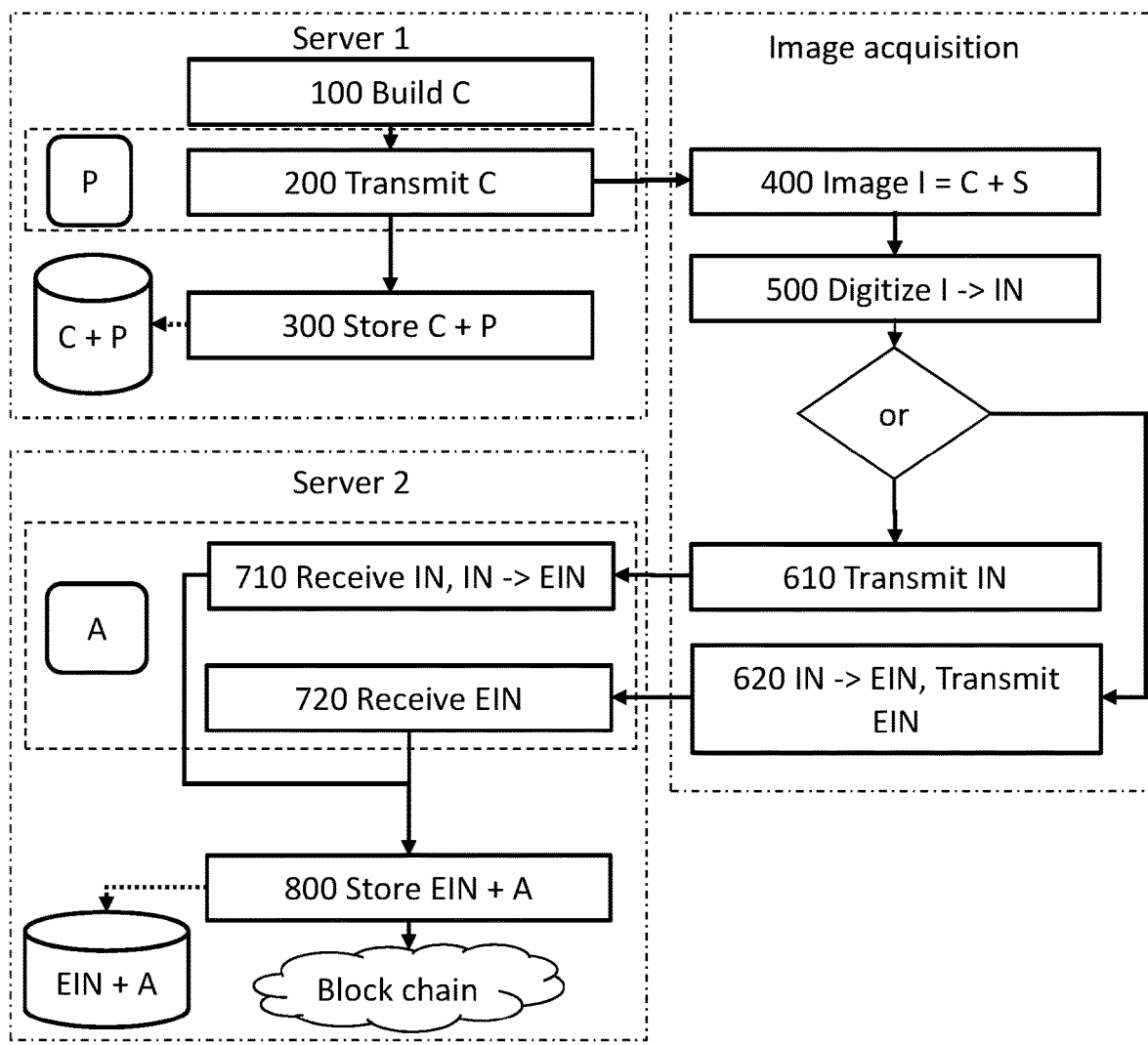
FIG. 1 is describing the different steps of a method implementing the current disclosure.

The invention is making use of a first server configured to provide a code previously unknown from the rest of the world before a "posteriority" date and a second server configured to provide certified time stamping of a digital image simultaneously imaging a main subject and the previously unknown code generated by the first server.

The joint digital image of the subject and the previously unknown code is to be considered with a broad meaning as it can be a digital photography having in its field of view a main subject and a previously unknown code representation, or a digitization of a joint picture of the subject and the previously unknown code, or the digitization of a document presenting the previously unknown code acquired with a digital camera, a smart phone, a digital scanner, a FAX system, a video camera or any other device for digital image acquisition.

Server is to be considered with its broadest meaning and can include a computer equipped with a processing unit or a set of computers, or a tangible media storing program instructions and data, with wire or wireless communication means.

Posteriority and anteriority dates are to be considered with their broadest meaning and it may be an advantage to use a universal time representation such as UTC.

The present invention can include a third server enabling retrieval amongst the data of the first and second servers of the posteriority and anteriority dates from a digital image and to transmit these dates to an external user. It is an advantage relative to data sharing and efficacy that the first, second and third servers are grouped into one single server sharing a unique database and able to deliver the previously unknown code, to certify time stamping and to prove the posteriority and anteriority dates from the digital image.

One way to display the previously unknown code in the field of the digital image consists in printing a representation of this previously unknown code on the observed subject or on one or several objects including in the field of view of the image. Such printing needs to be considered in its broadest meaning and is including the possibility to draw manually a representation of the previously unknown code on the observed subject, for example by writing on the skin of a human subject an alphanumerical representation of the previously unknown code using a demographic pen or by writing with a pen this code on a document included into the field of view.

Writing directly the code on the subject's skin has the advantage to make the joint digital image of the subject and of the previously unknown code extremely difficult to forge using a posteriori image processing because of the strong interconnections between the subject and the code. Indeed, the subject and the code need to exhibit the same image noise, lighting and reflections variations to be considered as genuine, which is very difficult to perform a posteriori in an undetectable way. Further, the writing is presenting very local variations due to skin texture, which are very difficult to forge.

Printing shall be considered with its broadest meaning. On top of the possibility to manually write the code, the invention can make use of an autonomous printer or a printer linked to a computer or a smart phone, it can also be a FAX machine or any other printing means.

Another way to present the previously unknown code in the image, which is very convenient relative to the rapidity to update it, is when the first server is configured to provide the previously unknown code to an electronic device configured to display a representation of this previously unknown code in the field of view of the digital image. Such electronic device display can be the screen of a computer, a tablet, a mobile phone or any other electronic device equipped with a video monitor.

When the electronic display is connected to the first server and the image digitization is connected to the second server, the time interval between the posteriority and anteriority dates can be made smaller than a second as the code can be refreshed periodically and frequently on the screen and as the digital image or its electronic fingerprint can be transmitted almost immediately to the second server, which is very advantageous.

One advantage of strongly reducing the time interval with this instance of the invention is that if someone wants to forge a digital image taken a long time before in order to integrate the previously unknown code via image processing, one would need to perform such operation between the time of the emission of the previously unknown code by the first server and the reception of the digital image or its electronic fingerprint, which can be impossible in practice.

Yet another way to present the previously unknown code in the image field of view can be to project on the subject an image representing the previously unknown code. An important advantage of such implementation is that there is a very strong interconnection between the subject and the previously unknown code, increasing the complexity of forgery.

It is an advantage if the system used to project the previously unknown code on the subject is connected to the first server so that it is receiving automatically and refreshing periodically the previously unknown code on the subject, reducing even more the time lap between the emission of the previously unknown code and the time stamp certification. The system to project the code can be a video projector, which can be connected to a computer linked to the first server, or it can be also a portable video projector linked to a smart phone, or any other image projection system.

The image digitization system can be a digital camera, a tablet or a smart phone equipped with a camera, a scanner, a FAX machine, a video camera, a radiology device or any other device able to generate a digital image.

In any case, it is an advantage if the image digitization system is able to transmit the digital image or an electronic fingerprint of this image to the second server. It is an advantage for bandwidth consideration to transmit to the second server a compact digital representation of the digital image, such as a hash code, which can be the result of a cryptography hash code such as the "SHA" as normalized by the NIST.

It is an advantage when the image digitization system or digital camera is linked to a computer and the computer is linked to the second server, or when the digital camera is integrated to a smart phone and this smart phone is configured to communicate with the second server, or when the image digitization system is a FAX machine configured to transmit the digital image directly to the second server. Such is increasing the speed of transmitting the information to the second server.

In any instance of the invention, except maybe in the case of the manual writing of the previously unknown code on the subject's skin, it is an advantage to use a bi-dimensional image representation of the previously unknown code instead of a simple alphanumerical representation. Such can be for example a bi-dimensional bar code, or a variant of such bi-dimensional bar code also called "QR" code (for "Quick Response"). One important advantage of such bi-dimensional representation of the previously unknown code is to increase the interconnection between the previously unknown code and the subject, which increases forgery complexity.

Another advantage of representing the previously unknown code with a bi-dimensional image and in particular 2D bar codes is that it can be analyzed automatically from the digital image in order to determine the previously unknown code and retrieve the exact date at which the previously unknown code was made public.

It can be an advantage that the 2D image representation of the previously unknown code projected on a subject is visually undetectable in the joint image of the subject and the previously unknown code and detectable only thanks to image analysis algorithms known by a person of ordinary skill in the art, thanks to techniques close to these used for the "watermarking" of digital images. An example of image watermarking technique is described in "Embedding Secret Information into a Dithered Multilevel Image", Proceedings of the IEEE Military Communications Conference (1990), pp 216-220, K. Tanaka, Y. Nakamura and K. Matsui. It can also be a filigree in the case of paper print or a watermarking on a screen.

Different ways to generate the previously unknown code are representing different variations of the invention.

When the owner of the first server is a trusted third party, a simple way to generate the previously unknown code it to store in the first server database a list of pairs constituted with a date and a random code, and to publish this random code only when that date is reached. The owner of the first server is then responsible to keep confidential the code prior to its publication. In the case of a random code computed at a given date, it is the responsibility of the owner of the first server to ensure that the algorithm used to generate the random code cannot be guessed in advance by another external person, for example by feeding the random code generation algorithm with a private key, and/or by including also into the random code generation the date itself or other external information.

The owner of the first server is then the trustee for the correspondence between the previously unknown code and its publication date, said date being the posteriority date. It is interesting that the owner of the first server is making public the list of correspondence between previously unknown codes and date once the posteriority date is passed, in order to facilitate legal proof.

In another implementation of the invention, where the owner of the first server is also considered as a trusted third party, the first server is used to encrypt an alphanumerical representation of the date thanks to a private key known only by the owner of the first server. The advantage of such implementation is that as long as the private key of the owner of the first server remains confidential, proof of posteriority is as strong as the reputation of the owner of the first server. Another advantage is that if the owner of the first server is making public the associated public key, then anyone is able to decrypt the date from a previously unknown code, which is an advantage to prove legally posteriority. As an example, the owner of the first server can encrypt with the private key of a PKI a digital representation of the UTC time, such as the Epoch, and communicate the public key of this PKI, in which case one can always demonstrate posteriority even in the case of disappearance of the owner of the first server and/or destruction of the private key.

Another interesting implementation of the generation of the previously unknown code, for which the owner of the first server doesn't need to be trusted, is to insert into the manufacturing of the previously unknown code, using a deterministic algorithm, public information which cannot be known in advance. Examples of such previously unknown information are instant stock market rates, like the NASDAQ or the Dow Jones, which evolution along time is unpredictable. This type of information: the instant rate of a stock market value, is publicly available and memorized by a lot of financial web sites. Another, more scientific way to generate a previously unknown code is using non-predictable objective physical measurements like solar activity intensity at a given time, as long as one or several scientific sources can measure and officially register the list of these measurements.

The code can be constructed using one or several sources of previously unknown information and in that case, it can be an advantage if the owner of the first server is making public the deterministic algorithm used to compute the code from these public sources so that anyone can re-generate the code for a given date and associated publicly available data. That way, the posteriority date can be verified independently from a trusted third party, which can be important in case of judicial proof.

For all these implementations making use of multiple independent previously unknown information, it may be interesting to shorten the concatenation of all the information by using a hash code of such a concatenation.

Other variations of implementations are related to the way time stamping is certified relative to anteriority.

In the case when the owner of the second server is a trusted third party, a simple way for this owner of the second server to certify time stamping is to register in a database the received digital image or received electronic fingerprint of this digital image in the second server. That way, the owner of the second server can ensure that the digital image was existing prior to a given anteriority date.

There is an advantage if the owner of the second server is making public such database including the correspondence between electronic fingerprint and reception date in order to facilitate the proof of anteriority and in that case, the owner of the second server can also choose to encrypt with his private key a combination of the electronic fingerprint and the reception date. By communicating this information, along with the public key, the owner of the second server is not obliged to store the information by himself.

There is also a different advantage in having the owner of the second server to keep confidential the database of the correspondence between the digital images and receiving dates and to provide, on a client-server model, the recorded reception date when receiving an electronic fingerprint from an external user and retrieving the reception date by searching for this electronic fingerprint in this database.

In case the owner of the second server cannot be trusted, there is an advantage in that the owner of the second server is inserting an electronic fingerprint of the digital image in a bloc chain in order to get the anteriority proof recorded on a worldwide basis. One possible example of implementation is to insert the electronic fingerprint into the Bitcoin block chain.

For all proposed implementations of the invention, there is an advantage in having a third server enabling to retrieve the posteriority date from a previously unknown code or to retrieve the digital image including a representation of the previously unknown code by searching into the database of the first server if such previously unknown code is referenced and by providing back the corresponding posteriority date.

It is also an advantage if a third server is configured to receive a digital image and compute its electronic fingerprint, or is configured to receive directly such electronic fingerprint, in order to retrieve from the second server the anteriority date, if any, associated with the provided electronic fingerprint.

One advantage of such implementation is to provide a method and a device in order to certify a posteriority and an anteriority date of the digital image with a reduced time interval between the two dates. Reducing time interval is also reducing the risk of forgery.

One specific aspect of the invention is relative to the image acquisition system, including means to receive the previously unknown code and means to acquire an image including a representation of a subject (S) and a representation of a previously unknown code. The image acquisition system is a separable element in the invention.

We are now describing practical designs for the method and device. With reference to the drawings, a possible implementation of the method is presented in FIG. 1 and composed of the following steps:

Manufacturing (100) by a first server at a date of posteriority (P) a previously unknown code (C).

Sending (200) by the first server of the previously unknown code (C) to an image acquisition system.

Storing (300) with the first server a combination (C+P) of the posteriority date (P) and the previously unknown code (C).

Acquiring (400) with the image acquisition system an image (I) including a joint representation of a subject (S) and the previously unknown code (C).

Digitizing (500) the image (I) and sending (610) the digital image (IN) or by default computing and sending (620) the electronic fingerprint (EIN) of this digital image (IN), to a second server, which can be also the same as the first server.

Receiving (710) at an anteriority date (A) with the second server the digital image (IN) from which the second server is computing the electronic fingerprint (EIN) or alternatively receiving (720) at an anteriority date (A) with the second server the electronic fingerprint (EIN) of the digital image (IN).

Storing (800) with the second server a combination (EIN+A) of the electronic fingerprint (EIN) and of the anteriority date (A) and inserting this combination (EIN+A) into a block chain.

The dates (P) and (A) have a broad meaning and can include day, hour, minute, second and fractions of a second; the Epoch numerical representation of the UTC is an interesting way to represent these dates. It is interesting also that the first server is synchronized with the UTC, for example by using the "NTP" protocol known by the person of ordinary skill in the art.

The previously unknown code (C) can be known solely by the owner of the first server prior to posteriority date (P) or be randomly generated at the posteriority date (P) using a method solely known by the owner of the first server, or be generated by using previously unknown external data by the owner of the first server in a possibly deterministic way. The previously unknown code (C) can be encrypted with a private key specific to the owner of the first server, who may choose or not to publish this encrypted data once the posteriority date (P) is passed.

The image acquisition system is defined with a broad sense and can include a camera, possibly digital, a smart phone or a tablet equipped with a photographic device, a scanner, a FAX machine, a video camera or any system for the acquisition and/or the digitization of an image. Further, it can include a computer connected to the second server and configured to receive the digital image (IN), to compute its electronic fingerprint (EIN) and to transmit it to the second server. It is interesting to use a smart phone equipped with a digital camera system because such smart phone is equipped with computation means enabling the computation of electronic fingerprints and with communication means enabling sending directly such electronic fingerprint to the second server.

Several different ways to acquire the joint image of a subject (S) and a representation of a previously unknown code (C) are available. A printed representation of the code (C) can be included into the field of view of the image, a representation of the code can be displayed on a screen or projected on the subject or it can be any other way to insert a representation of the previously unknown code (C) in the image.

Several ways to represent the previously unknown code (C) can be used, including an alphanumerical representation and/or a bar code or a QR code representation. In the case of printing, it is an advantage to use a bar code or a QR code as these can be automatically read from a digital image thanks to image analysis algorithms known by a person of ordinary skill in the art. Another simple way to insert the previously unknown code (C) is to draw manually an alphanumerical representation of this previously unknown code (C) on the subject (S) or on one or several objects close to the subject (S) and included in the field of view of the image (I).

Printing can also be performed by using a printer linked to a computer, a smart phone or a tablet, or by using a FAX or any other system able to receive a representation of the previously unknown code (C) and to print it. In case a screen is used to display the previously unknown code (C), display can be performed using the screen display of a computer, of a smart phone, of a tablet or of any other electronic device including a screen and receiving the previously unknown code (C) from the first server. In case a representation of the code is projected, the device used to project it can be a video projector, possibly linked to a computer, a smart phone, a tablet or any electronic device enabling receiving the previously unknown code (C) from the first server and projecting its representation.

First and second servers can be distinct or be the same device without changing the invention.

As noticed, the computation of the electronic fingerprint (EIN) of the digital image (IN) can be performed on the side of image acquisition or on the side of the second server without changing the invention. It can be an advantage if the electronic fingerprint (EIN) is computed on the image acquisition system side in order to reduce the need of a large bandwidth between the image acquisition system and the second server. Conversely, it is also an advantage to transmit the digital image (IN) to the second server so that it is also stored into the second server. To combine both advantages, the electronic fingerprint (EIN) can be computed first by the image acquisition system and transmitted to the second server, and then the digital image (IN) itself can then be transferred for storage to the second server as a background task. In this later case, it is an advantage that the anteriority date (A) is the date of reception by the second server of the electronic fingerprint (EIN) so that it is reducing the interval of time between posteriority and anteriority date, the digital image (IN) being transmitted later on.

For the recording step (800) of the correspondence between the electronic fingerprint (EIN) and the anteriority date (A), it is an advantage to insert a code (EIN+A) combining the electronic fingerprint (EIN) and the anteriority date (A) into a block chain. One can use the Crypto Currency "Bitcoin" for such purpose.

Figure 2:
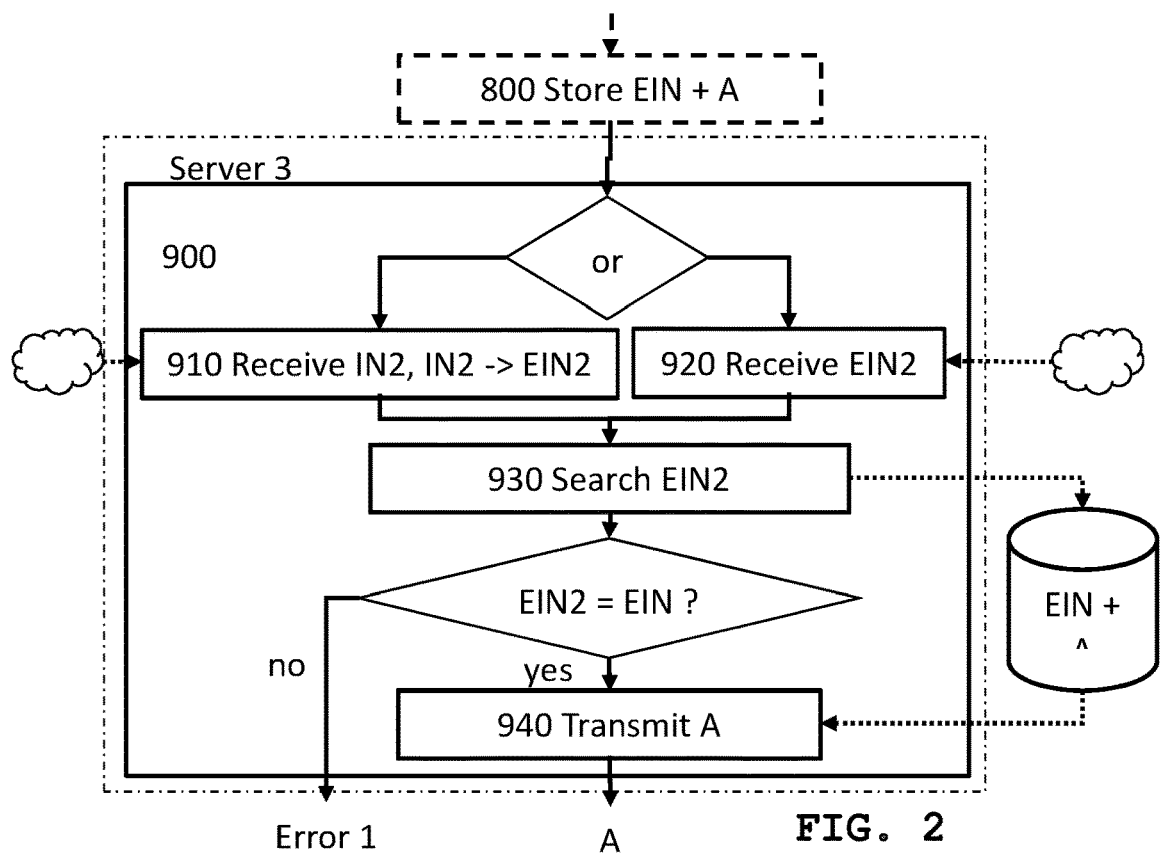
FIG. 2 is presenting the additional step of retrieving an anteriority date from a digital fingerprint.

Another implementation of the method according to the invention is presented in FIG. 2. It includes an additional step (900) performed after the recording step (800) of the correspondence (EIN+A) of the digital fingerprint (EIN) and the anteriority date (A) and is performed by a third server sharing the same database as the second server, and possibly identical to the second server, with such additional step (900) including the following sub-steps:

Receiving (910) a second digital image (IN2) and computing of a second electronic fingerprint (EIN2) or alternatively directly receiving (920) a second electronic fingerprint (EIN2).

Searching (930) for the second electronic fingerprint (EIN2) in the database of the second server.

In case this second electronic fingerprint (EIN2) is corresponding (EIN2=EIN) to a recorded electronic fingerprint (EIN), transmitting (940) the anteriority date (A) corresponding to the recorded combination of the electronic fingerprint (EIN) and the anteriority date (A).

Such implementation enables an external user to retrieve or verify the anteriority date (A) of a digital image (IN2) possessed by this external user or from an electronic fingerprint (EIN2) that this external user is possessing.

Figure 3:
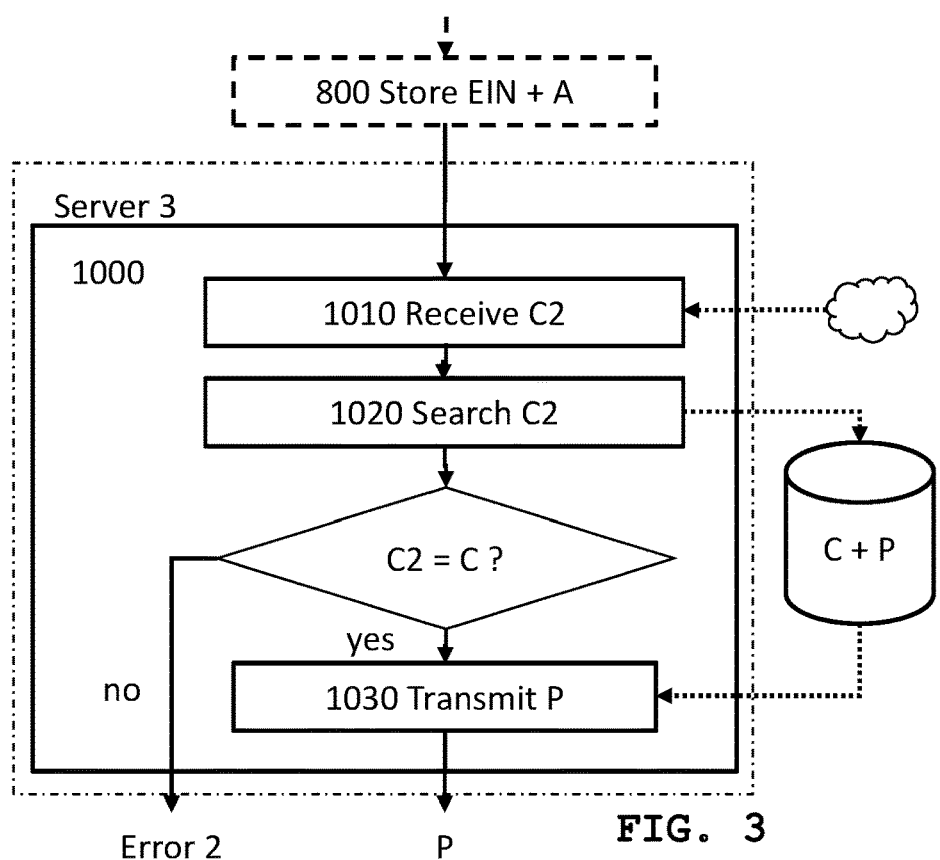
FIG. 3 is presenting the additional step of retrieving a posteriority date from a previously unknown code.

Another implementation of the method according to the invention is presented in FIG. 3 and is including an additional step (1000) performed after the recording step (800) of the correspondence (EIN+A) of the electronic fingerprint (EIN) and the anteriority date (A), and using a third server, accessing to the same database than the first server or being identical to the first server, and including the following sub-steps:

Receiving (1010) a second previously unknown code (C2).

Searching (1020) for this second previously unknown code (C2) in the database of the first server.

In case the second previously unknown code (C2) corresponds (C2=C) to a previously unknown code (C) stored in the database of the first server, transmitting (1030) the posteriority date (P) associated with the stored combination of the previously unknown code (C) and the posteriority date (P).

Such implementation of the method according to the invention enables an external user to retrieve or to verify the posteriority date (P) of a second previously unknown code (C2) that this external user is possessing or is reading, directly or by using an image analysis algorithm, from a second digital image (IN2) that this user possesses.

Figure 4:
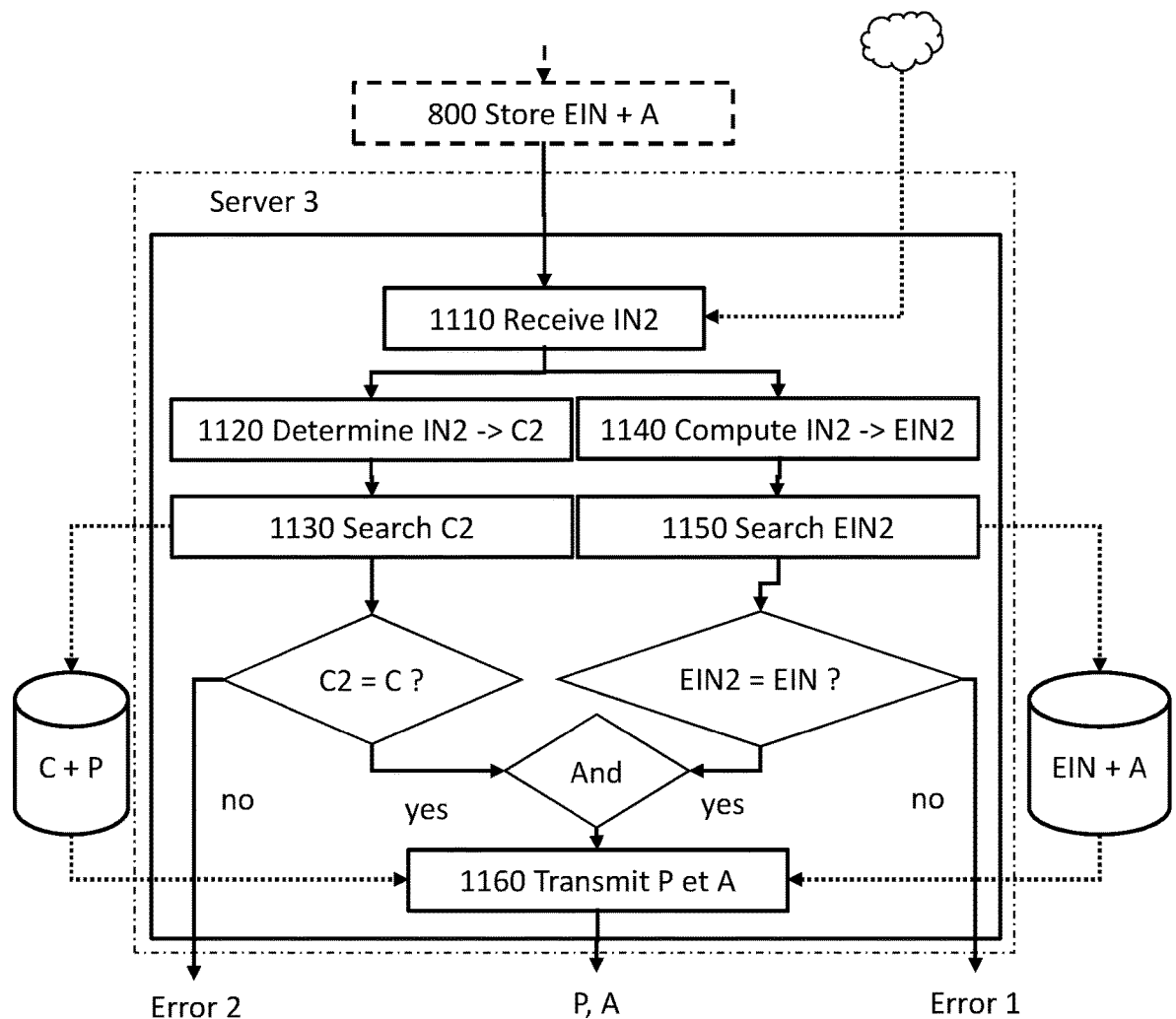
FIG. 4 is presenting the additional step of retrieving both a posteriority and an anteriority dates from a digital image.

Another implementation of the method according to the invention is presented in FIG. 4 and is including an additional step (1100) performed after the recording step (800) of the correspondence (EIN+A) between the electronic fingerprint (EIN) and the anteriority date (A), and using a third server having access to the databases of the first and the second server, possibly identical to the first and second server, with such additional step (1100) including the following sub-steps:

Receiving (1100) a second digital image (IN2) including a representation of a second previously unknown code (C2).

Determining (1200) the second previously unknown code (C2) from the digital image (IN2).

Searching (1130) for the second previously unknown code (C2) in the database of the first server.

Computing (1140) a second electronic fingerprint (EIN2) from the second digital image (IN2).

Searching (1150) for the second electronic fingerprint (EIN2) in the database of the second server.

In case the second previously unknown code (C2) of step (1120) is corresponding (C2=C) to the previously unknown code of step (100) and that the second electronic fingerprint (EIN2) of step (1150) is corresponding (EIN2=EIN) to the electronic fingerprint (EIN) stored at step (710) or (720), transmitting the posteriority date (P) associated to the previously unknown code (C) stored and the anteriority date (A) corresponding to the electronic fingerprint (EIN) stored and corresponding to the digital image (IN2=IN) of step (100) and (1100).

Such implementation of the method according to the invention is especially useful in case an external user is willing to retrieve both the posteriority date (P) and anteriority date (A) recorded, from a digital image (IN2) that this user possesses.

Figure 5:
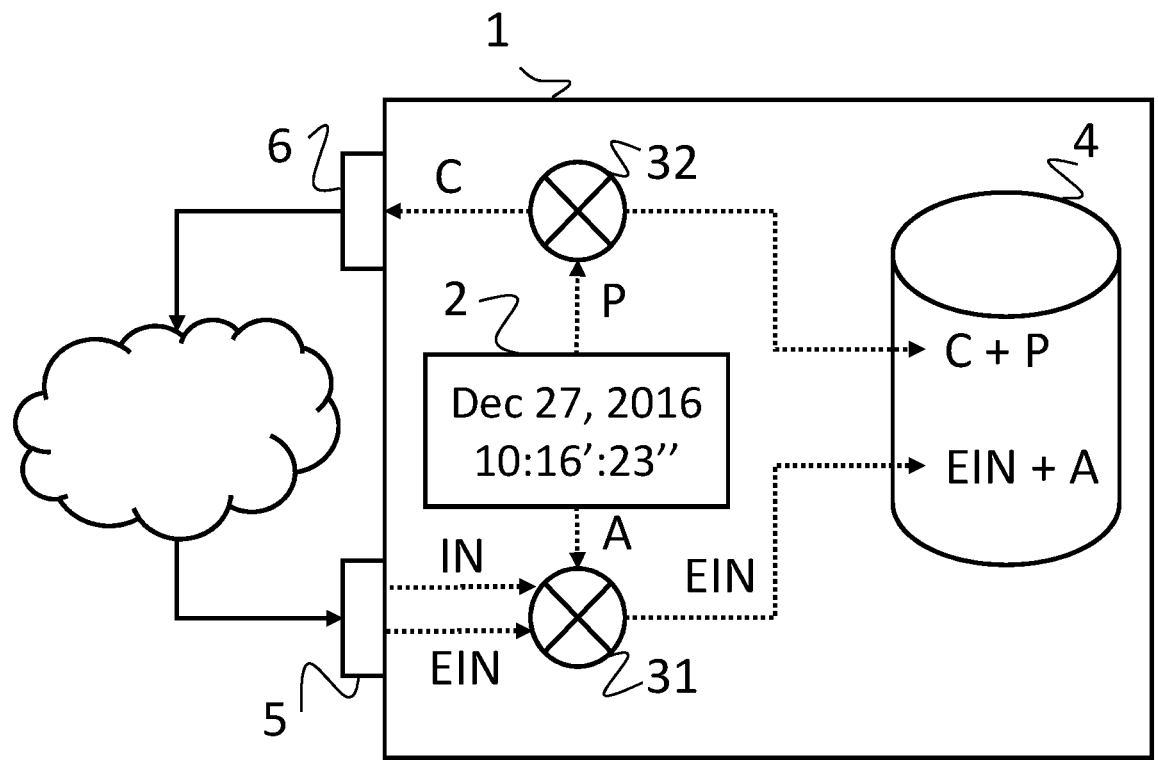
FIG. 5 is presenting a device according to the present invention.

A device according to the present invention is presented in FIG. 5. It is including at least one server (1) configured in order to certify the anteriority date of a digital file, equipped with a time measurement tool (2), computation means (3) and in particular means to compute electronic fingerprints of digital files (31), storage capacity (4), information reception means (5) and information sending means (6), whereas said server is comprizing means to:

Generate (32) a previously unknown code (C) and record a combination (C+P) of data including the previously unknown code (C) and its creation date (P), said date (P) being called "posteriority" date.

Transmit (6) the previously unknown code (C).

Receive (5) a digital image (IN) including a representation of the previously unknown code (C) and compute the electronic fingerprint (EIN) of the digital image (IN) or alternatively receive directly the electronic fingerprint (EIN) of the digital image (IN).

Record a combination (EIN+A) including the electronic fingerprint (EIN) of the digital image (IN) and the reception date (A) of the digital image (IN) or alternatively the reception date (A) of the electronic fingerprint (EIN) of the digital image (IN), said reception date (A) being called "anteriority" date, and transmit (6) this combination (EIN+A) for insertion into a block chain.

Such device can be a computer connected to Internet and configured such that it can send or receive information and storing program instructions adapted to perform the steps of the method described in the disclosed invention.

A way to synchronize such computer to the UTC is to use the NTP protocol (for "Network Time Protocol"). A way to generate the previously unknown code (C) is to generate a random code at the posteriority date (P), for example by using the "srand( )" program command in C programming to initialize the random sequence, possibly using the instant date and then by using the "rand( )" program command in C programming to generate new random numbers.

A way to compute the electronic fingerprint (EIN) of the digital image (IN) is to use the "SHA" method (for "Secure Hash Algorithm"), standardized by the US "National Institute of Standards and Technology" (NIST).

One of the at least one server (1) of the disclosed device is configured to insert the combination (EIN+A) of the electronic fingerprint (EIN) and the anteriority date (A) into a bloc chain. One example of such bloc chain can be the Crypto Currency "Bitcoin".

Figure 6:
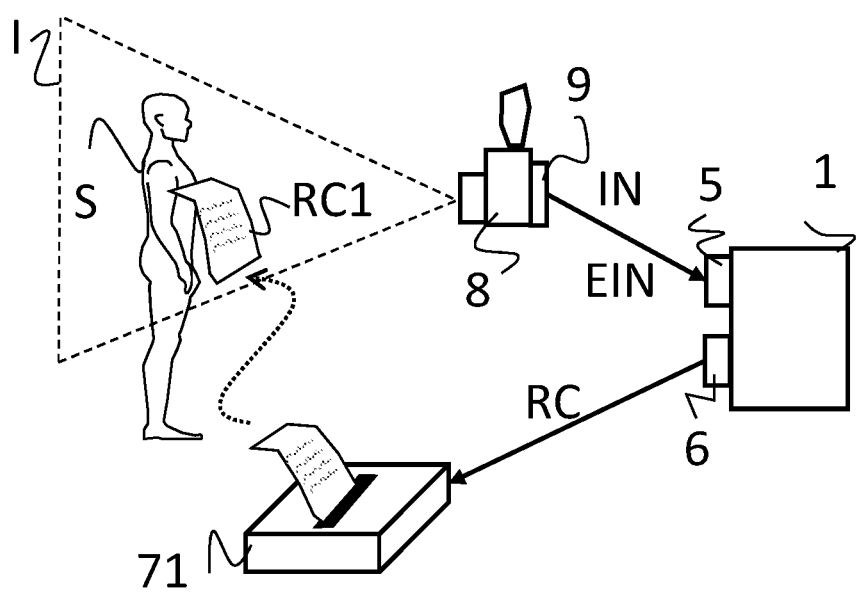
FIG. 6 is presenting a variation of the device using a printing unit.

FIG. 6 is presenting an implementation of the disclosed device including a front-end device (71) equipped with a printer and configured in order to receive a representation (RC) of the previously unknown code (C) generated (6) by one of the at least one server (1), and the printer of the front-end device (71) is configured to print (RC1) such representation (RC) of the previously unknown code (C).

Printing (RC1) has a broad meaning and can be printing on a paper form or a cardboard form or printing directly on the subject (S). The printer associated with the front-end device (71) can be a printer linked to a computer, to a smart phone or to a tablet, or be a FAX device or any other electronic device able to receive a representation of the previously unknown code (C) and to print it. The code representation (RC) can be alphanumerical, a bar code, possibly 2D, a QR code or any other representation of the previously unknown code (C). The print (RC1) is placed side by side with the subject (S) in the field of view of the image (I) or is printed directly on the subject (S), as long as it is included into the field of view of the image (I).

Figure 7:
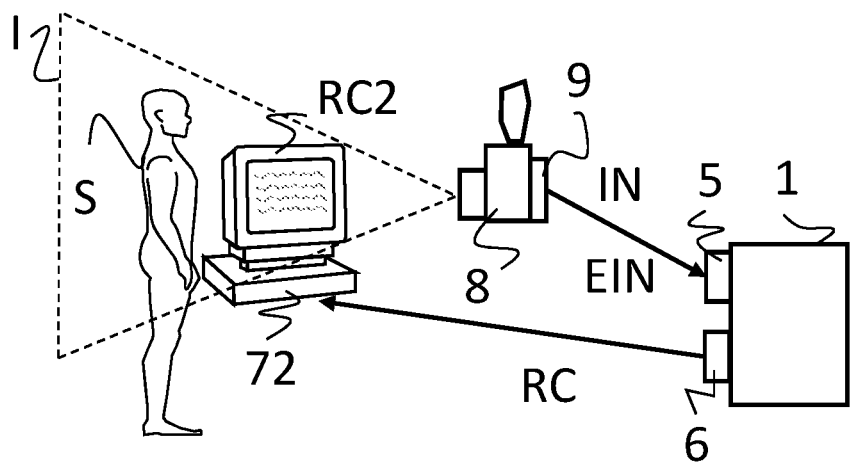
FIG. 7 is presenting a variation of the device using a video screen.

FIG. 7 is presenting an implementation of the disclosed device including a front-end device (72) equipped with a screen configured in order to receive from one of the at least one server (1) a representation (RC) of the previously unknown code (C), said front-end device (72) being configured to display (RC2) the representation (RC) of the previously unknown code (C) on the screen. The front-end device (72) can be a computer equipped with a screen display, a tablet, a smart phone or any other electronic device including a screen and able to receive from one of the at least one server (1) and display the previously unknown code (C). The screen of the front-end device (72) can be placed side by side to the subject (S) in the field of view of the image (I), such that the display (RC2) is included into the image (I). In a specific implementation of the disclosed device, the screen of the front-end device can be the subject (S) itself.

Figure 8:
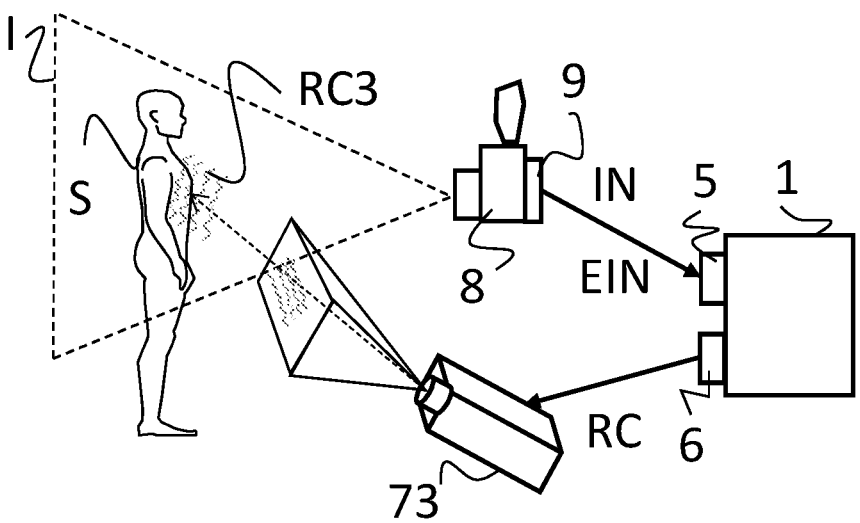
FIG. 8 is presenting a variation of the device using a video projector.

FIG. 8 is presenting an implementation of the disclosed device including a front-end device (73) equipped with a projector and configured to receive from one of the at least one server (1) a representation (RC) of the previously unknown code (C) and to project (RC3) the representation (RC) of the previously unknown code (C). The projection (RC3) is included in the field of view of the image (I).

The disclosed device according to the implementations of FIG. 6, 7 or 8 can be supplemented with a system to acquire and digitize an image (8) configured to acquire a joint image (I) of a subject (S) and a representation (RC) of the previously unknown code (C) and to transmit (9) to one of the at least one server (1) a digital representation (IN) of the image (I) or alternatively an electronic fingerprint (EIN) of the digital image (IN). The printed, displayed or projected representation (RC) is placed side by side to the subject (S) or on the subject (S) such that the representation (RC) is included in the field of view of the image acquisition system (8). The image acquisition and digitization system has a broad meaning and can be a regular camera associated to a scanner, a digital camera, a smart phone, a computer or a tablet equipped with a camera, a scanner, a FAX system, a video camera or any other electronic device able to acquire an image. It is specifically interesting to use a smart phone equipped with a camera as a smart phone is equipped with processing means enabling the computation of a digital fingerprint and with communication means to transmit the electronic fingerprint to one of the at least one server (1).

Figure 9:
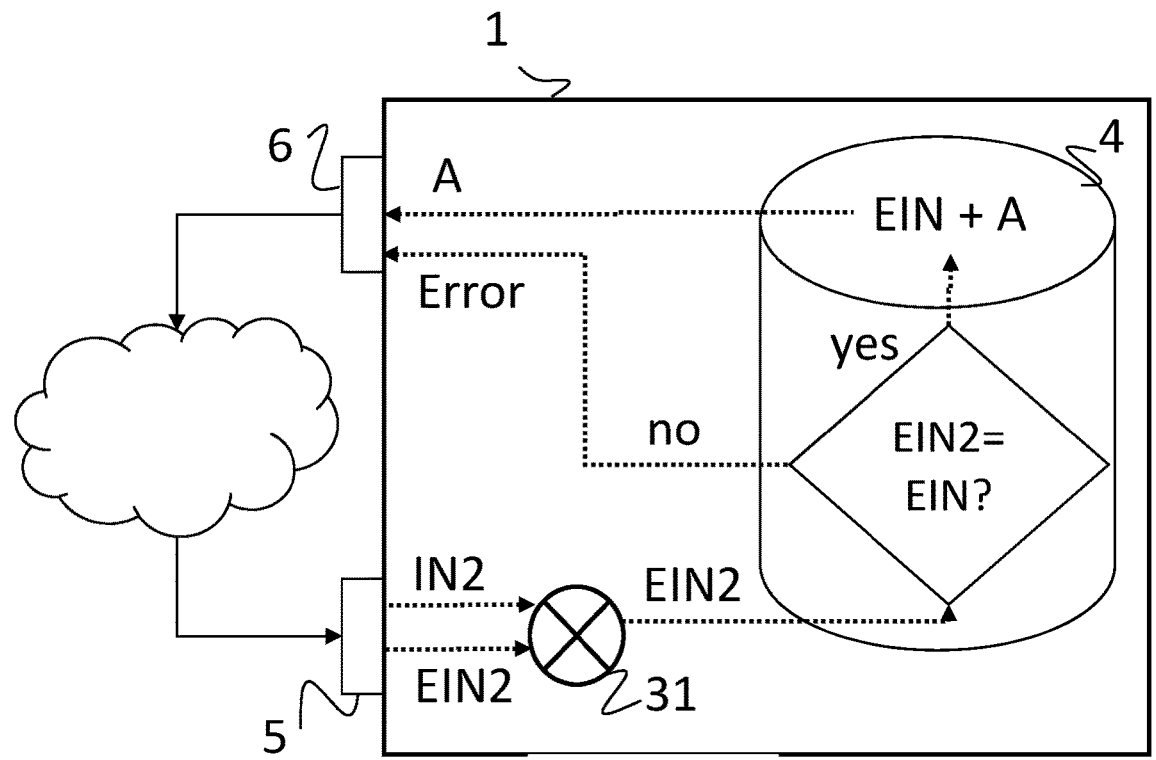
FIG. 9 is presenting a variation of the device enabling retrieval of an anteriority date from a digital fingerprint.

A specific implementation of the disclosed device is presented in FIG. 9, where one of the at least one server (1) is configured to receive (5) a second digital image (IN2) and to compute a second electronic fingerprint (EIN2) or alternatively configured to receive directly the second electronic fingerprint (EIN2) of the second digital image (IN2), to search the storage means (4) for a corresponding electronic fingerprint (EIN) of the digital image (IN) and in the case both electronic fingerprints (EIN2) and (EIN) are matching, to transmit (6) the anteriority date (A) associated to the recorded combination (EIN+A) of the electronic fingerprint (EIN) and the anteriority date (A).

Such implementation enables an external user to retrieve or to verify the anteriority date (A) of a second digital image (IN2) or the second electronic fingerprint (EIN2) of the second digital image (IN2) possessed by the user.

Figure 10:
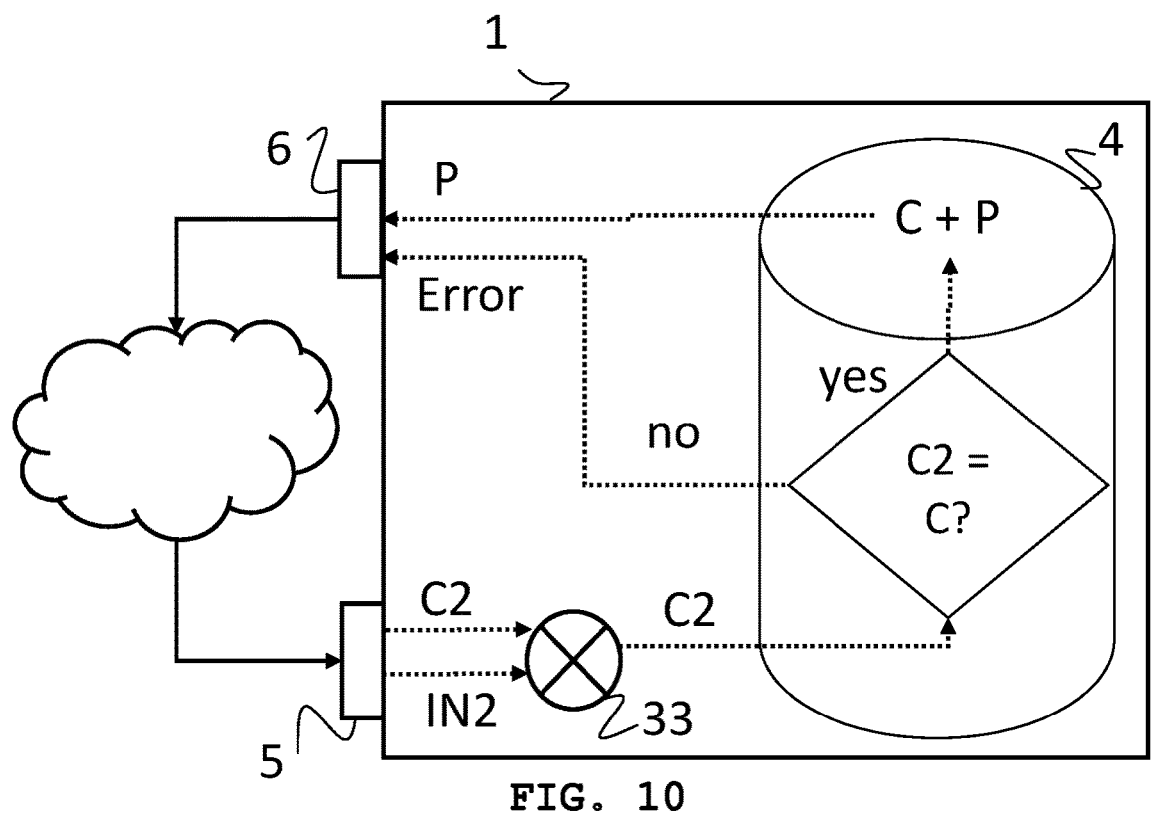
FIG. 10 is presenting a variation of the device enabling retrieval of a posteriority date from a previously unknown code.

Yet another specific implementation of the disclosed device is presented in FIG. 10, where one of the at least one server (1) is configured to receive (5) a second previously unknown code (C2), to search in the storage capacity (4) for a corresponding first previously unknown code (C) stored and in the case the second previously unknown code (C2) is corresponding to the first previously unknown code (C), to transmit (6) the posteriority date (P) associated to the combination (C+P) of the first previously unknown code (C) and the posteriority date (P).

Such implementation is enabling an external user to retrieve or verify a posteriority date (P) for a second previously unknown code (C2) that the user possesses or read such second previously unknown code (C2) directly or by using an image analysis algorithm, from a second digital image (IN2) that the user is possessing.

Also according to FIG. 10, in yet another implementation of the disclosed device, one of the at least one server (1) is configured in order to receive a second digital image (IN2) including the representation of a second previously unknown code (C2), to analyze by using image analysis means (33) this second digital image (IN2) in order to determine the second previously unknown code (C2), to search the storage means (4) for a corresponding first previously unknown code (C) stored, and in case the first previously unknown code (C) and the second previously unknown code (C2) are corresponding, to transmit (6) the posteriority date (P) associated to the stored combination (C+P) of the first previously unknown code (C) and the posteriority date (P).

Figure 11:
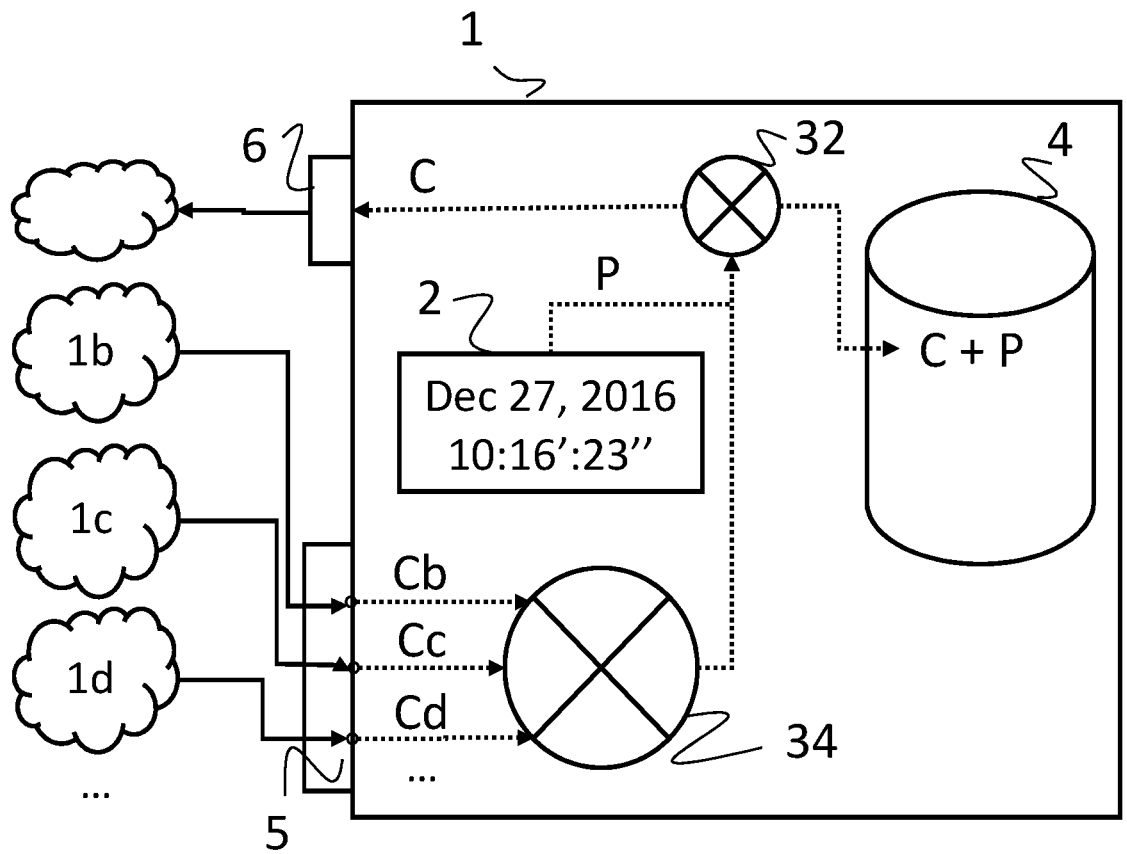
FIG. 11 is presenting a variation of the device enabling the manufacturing of a previously unknown code from several external information sources.

FIG. 11 is presenting another implementation of the disclosed device where one of the at least one server (1) is configured to receive (5) the information coming from a set of servers (1b, 1c, 1d, . . . ) able to transmit previously unknown information (Cb, Cc, Cd, . . . ), and where the computation capacity (34) is configured to build a previously unknown code (C) from these previously unknown information (Cb, Cc, Cd, . . . ).

One way to build the previously unknown code (C) in this case is to concatenate the different previously unknown information (Cb, Cc, Cd, . . . ) into a single alphanumerical representation and to compute a simplified digital representation of this alphanumerical representation by using a hash code such as produced by the "SHA" ("Secure Hash Algorithm") standardized by the US "National Institute of Standards and Technology" (NIST). Examples of such external sources of previously unknown information are instant stock market rates, news online streaming videos or physical scientific data of space origin and provided by research institutes.

The method and device according to the disclosure are specifically intended to provide a posteriority date and an anteriority date to precisely define the acquisition date of a digital image. One particular application of the disclosure is Clinical Research where digital images certified relative to their posteriority and anteriority dates can be used to demonstrate that a given study protocol is fulfilled by participating clinical sites and that specific operations in this protocol are performed in the scheduled timeframe.

What is claimed is:

1. A method to time stamp digital images providing a proof that a digital image has been acquired after a first date, said date being named "posteriority" date and before a second date, said date being named "anteriority" date, comprising the steps of:

building with a first server, prior to or at a date of posteriority, a previously unknown code;

transmitting by the first server at the posteriority date the previously unknown code;

storing in the first server a combination of the posteriority date and the previously unknown code;

receiving with a second server at an anteriority date a first digital image of a joint representation of a subject and of the previously unknown code and computing a first electronic fingerprint of the first digital image or alternatively receiving directly with the second server at the anteriority date the first electronic fingerprint of the first digital image;

storing with the second server a combination of the first electronic fingerprint and the anteriority date;

receiving with a third server a second digital image and computing a second digital fingerprint or alternatively receiving directly with the third server the second electronic fingerprint of the second digital image;

searching in a database of the second server the first electronic fingerprint corresponding to the second electronic fingerprint; and in case the second electronic fingerprint corresponds to the first electronic fingerprint stored in the database of the second server, transmitting with the third server the anteriority date corresponding to the stored combination of the first electronic fingerprint and the anteriority date.

2. The method according to claim 1, wherein during the building step of the previously unknown code, such code is manufactured from one or several external sources of previously unknown information.

3. The method according to claim 1, comprising between the step of transmitting with the first server the previously unknown code and the step of receiving with the second server the first digital image or alternatively receiving directly with the second server the first electronic fingerprint of the first digital image, the additional steps of:

acquiring with an image acquisition system an image comprising a joint representation of a subject and a representation of the previously unknown code transmitted by the first server; and digitizing the image and transmitting the first digital image or alternatively computing and transmitting the first electronic fingerprint of the first digital image to the second server.

4. The method according to claim 3, wherein a representation of the previously unknown code is printed on the subject or on one or several objects and that at least one representation of the previously unknown code is included in a field of view of the first digital image.

5. The method according to claim 3, wherein a representation of the previously unknown code is displayed in one or several screen displays included in a field of view of the first digital image.

6. The method according to claim 3, wherein a representation of the previously unknown code is projected on the subject or on one or several objects and that at least one projected representation of the previously unknown code is included in a field of view of the first digital image.

7. The method according to claim 1, wherein the combination of the first electronic fingerprint and the anteriority date is inserted into a block chain.

8. A method to time stamp digital images providing a proof that a digital image has been acquired after a first date, said date being named "posteriority" date and before a second date, said date being named "anteriority" date, comprising the steps of:

building with a first server, prior to or at a date of posteriority, a first previously unknown code;

transmitting by the first server at the posteriority date the first previously unknown code;

storing in the first server a combination of the posteriority date and the first previously unknown code;

receiving with a second server at an anteriority date a first digital image of a joint representation of a subject and of the first previously unknown code and computing a first electronic fingerprint of the first digital image or alternatively receiving directly with the second server at the anteriority date the first electronic fingerprint of the first digital image;

storing with the second server a combination of the first electronic fingerprint and the anteriority date;

receiving with a third server a second previously unknown code or alternatively receiving with the third server a second digital image including a representation of a second previously unknown code and determining the second previously unknown code from the second digital image;

searching in a database of the first server the first previously unknown code corresponding to the second previously unknown code; and in case the second previously unknown code corresponds to the first previously unknown code, transmitting with the third server the posteriority date corresponding to the stored combination of the first previously unknown code and the posteriority date.

9. The method according to claim 8, wherein the third server is receiving a second digital image including a representation of a second previously unknown code, and comprising the additional steps of:

computing a second electronic fingerprint from the second digital image;

searching in a database of the second server the first electronic fingerprint corresponding to the second electronic fingerprint; and in case the second electronic fingerprint corresponds to the first electronic fingerprint, transmitting with the third server the anteriority date corresponding to the combination of the first electronic fingerprint and the anteriority date.

10. The method according to claim 8, wherein the combination of the first electronic fingerprint and the anteriority date of the first digital image is inserted into a block chain.

11. The method according to claim 8, wherein during the building step of the first previously unknown code, such code is manufactured from one or several external sources of previously unknown information.

12. The method according to claim 8, comprising between the step of transmitting with the first server the first previously unknown code and the step of receiving with the second server the first digital image or alternatively receiving directly with the second server the first electronic fingerprint of the first digital image, the additional steps of:

acquiring with an image acquisition system an image comprising a joint representation of a subject and a representation of the first previously unknown code transmitted by the first server; and digitizing the image and transmitting the first digital image of the image or alternatively computing and transmitting the first electronic fingerprint of the first digital image to the second server.

13. The method according to claim 12, wherein a representation of the first previously unknown code is printed on the subject or on one or several objects and that at least one representation of the first previously unknown code is included in a field of view of the first digital image.

14. The method according to claim 12, wherein a representation of the first previously unknown code is displayed in one or several screen displays included in a field of view of the first digital image.

15. The method according to claim 12, wherein a representation of the first previously unknown code is projected on the subject or on one or several objects and that at least one projected representation of the first previously unknown code is included in a field of view of the first digital image.

16. A computer program product embodied on a non-transitory computer-readable storage medium for processing image data comprising:
computer code for building, prior to or at a date of posteriority, a previously unknown code;
computer code for transmitting at the posteriority date the previously unknown code;
computer code for storing a combination of the posteriority date and the previously unknown code;
computer code for receiving at an anteriority date a first digital image of a joint representation of a subject and of the previously unknown code and computing a first electronic fingerprint of the first digital image or alternatively for receiving directly at the anteriority date the first electronic fingerprint of the first digital image;
computer code for storing a combination of the first electronic fingerprint and the anteriority date;
computer code for receiving a second digital image and computing a second digital fingerprint or alternatively receiving directly the second electronic fingerprint of the second digital image;
computer code for searching in a database the first electronic fingerprint corresponding to the second electronic fingerprint; and
computer code for transmitting the anteriority date corresponding to the stored combination of the first electronic fingerprint and the anteriority date in case the second electronic fingerprint corresponds to the first electronic fingerprint stored in the database.

17. A device to time stamp digital images comprising: at least one server configured to certify an anteriority of digital files, equipped with a system to measure time; a processor; a memory in electronic communication with the processor; instructions stored in the memory and operable, when executed by the processor, to compute electronic fingerprints of digital files; an interface to receive data; and an additional interface to transmit data; wherein said instructions stored, when executed by the processor:
generate at a first date, said date being named the "posteriority" date, a previously unknown code and store a combination of the previously unknown code and the posteriority date;
transmit the previously unknown code;
receive at a second date, said date being named the "anteriority" date, a first digital image of a joint representation of a subject and of the previously unknown code and compute a first electronic fingerprint of the first digital image or alternatively receive directly the first electronic fingerprint of the first digital image; and
store in the memory a combination of the first electronic fingerprint and the anteriority date;
wherein one of the at least one server is configured to receive a second digital image and compute a second electronic fingerprint or alternatively to receive directly the second electronic fingerprint of the second digital image, to search the memory for the first electronic fingerprint corresponding to the second electronic fingerprint and in case the second electronic fingerprint is corresponding to the first electronic fingerprint, to transmit the anteriority date associated with the combination of the first electronic fingerprint and the anteriority date stored in the memory.

18. The device of claim 17, wherein one of the at least one server is configured to receive data from a set of servers able to transmit previously unknown information and to compute the previously unknown code from the previously unknown information.

19. The device of claim 17, comprising a front-end device equipped with a printing system, and wherein one of the at least one server is configured to transmit a representation of the previously unknown code to the front-end device, and that the front-end device is configured to print the representation of the previously unknown code.

20. The device of claim 17, comprising a front-end device equipped with a screen display, and wherein one of the at least one server is configured to transmit a representation of the previously unknown code to the front-end device, and that the front-end device is configured to display the representation of the previously unknown code on the screen display.

21. The device of claim 17, comprising a front-end device equipped with an image projector, and wherein one of the at least one server is configured to transmit a representation of the previously unknown code to the front-end device, and that the front-end device is configured to project the representation of the previously unknown code with the image projector.

22. The device of claim 17, comprising a system to acquire and digitize an image wherein the image acquisition system is configured to acquire the joint image of a subject and of a representation of a previously unknown code and to transmit to one of the at least one server the first digital image of the image or alternatively to transmit the first electronic fingerprint of the first digital image.

23. The device of claim 17, wherein a second server is configured to insert the combination of the first electronic fingerprint and the anteriority date into a block chain.

24. A device to time stamp digital images comprising: at least one server configured to certify an anteriority of digital files, equipped with a system to measure time; a processor; a memory in electronic communication with the processor; instructions stored in the memory and operable, when executed by the processor, to compute electronic fingerprints of digital files; an interface to receive data; and an additional interface to transmit data;
wherein said instructions stored, when executed by the processor:
generate at a first date, said date being named the "posteriority" date, a first previously unknown code and store a combination of the first previously unknown code and the posteriority date;
transmit the first previously unknown code;
receive at a second date, said date being named the "anteriority" date, a first digital image of a joint representation of a subject and of the first previously unknown code and compute a first electronic fingerprint of the first digital image or alternatively receive directly the first electronic fingerprint of the first digital image; and
store in the memory a combination of the first electronic fingerprint and the anteriority date;
wherein one of the at least one server is configured to execute by the processor the instructions stored to receive a second previously unknown code or alternatively to receive a second digital image incorporating the representation of a second previously unknown code and to perform image analysis instructions to analyze the second digital image in order to determine the second previously unknown code; to search the memory for the first previously unknown code stored and corresponding to the second previously unknown code, and in case the second previously unknown code is corresponding to the first previously unknown code, to transmit the posteriority date associated to the combination of the first previously unknown code and the posteriority date stored in the memory.

25. The device of claim 24, wherein one of the at least one server is configured to receive a second digital image;
wherein the server receiving the second digital image is configured to compute a second electronic fingerprint of the second digital image, to search the memory for the first electronic fingerprint corresponding to the second electronic fingerprint and in case the second electronic fingerprint is corresponding to the first electronic fingerprint, to transmit the anteriority date associated with the combination of the first electronic fingerprint and the anteriority date stored in the memory.

26. The device of claim 24, wherein a second server is configured to insert the combination of the first electronic fingerprint and the anteriority date into a block chain.

27. The device of claim 24, wherein one of the at least one server is configured to receive data from a set of servers able to transmit previously unknown information and to compute the first previously unknown code from the previously unknown information.

28. The device of claim 24, comprising a front-end device equipped with a printing system, and wherein one of the at least one server is configured to transmit a representation of the first previously unknown code to the front-end device, and that the front-end device is configured to print the representation of the first previously unknown code.

29. The device of claim 24, comprising a front-end device equipped with a screen display, and wherein one of the at least one server is configured to transmit a representation of the first previously unknown code to the front-end device, and that the front-end device is configured to display the representation of the first previously unknown code on the screen display.

30. The device of claim 24, comprising a front-end device equipped with an image projector, and wherein one of the at least one server is configured to transmit a representation of the first previously unknown code to the front-end device, and that the front-end device is configured to project the representation of the first previously unknown code with the image projector.

31. The device of claim 24, comprising a system to acquire and digitize an image wherein the image acquisition system is configured to acquire a joint image of a subject and of a representation of a first previously unknown code and to transmit to one of the at least one server a first digital image representation of the image or alternatively to transmit the first electronic fingerprint of the first digital image.

32. A computer program product embodied on a non-transitory computer-readable storage medium for processing image data comprising:
computer code for building, prior to or at a date of posteriority, a first previously unknown code;
computer code for transmitting at the posteriority date the first previously unknown code;
computer code for storing a combination of the posteriority date and the first previously unknown code;
computer code for receiving at an anteriority date a first digital image of a joint representation of a subject and of the first previously unknown code and computing a first electronic fingerprint of the first digital image or alternatively receiving directly with the second server at the anteriority date the first electronic fingerprint of the first digital image;
computer code for storing a combination of the first electronic fingerprint and the anteriority date;
computer code for receiving a second previously unknown code or alternatively receiving a second digital image including a representation of a second previously unknown code and determining the second previously unknown code from the second digital image;
computer code for searching in a database the first previously unknown code corresponding to the second previously unknown code; and
computer code for transmitting the posteriority date corresponding to the stored combination of the first previously unknown code and the posteriority date in case the second previously unknown code corresponds to the first previously unknown code.

* * * * *